United States Patent Office 3,574,031
Patented Apr. 6, 1971

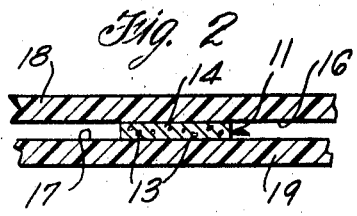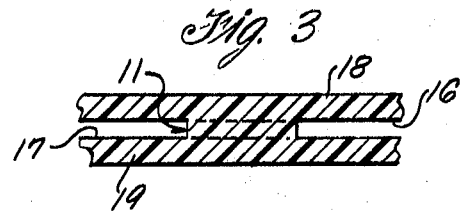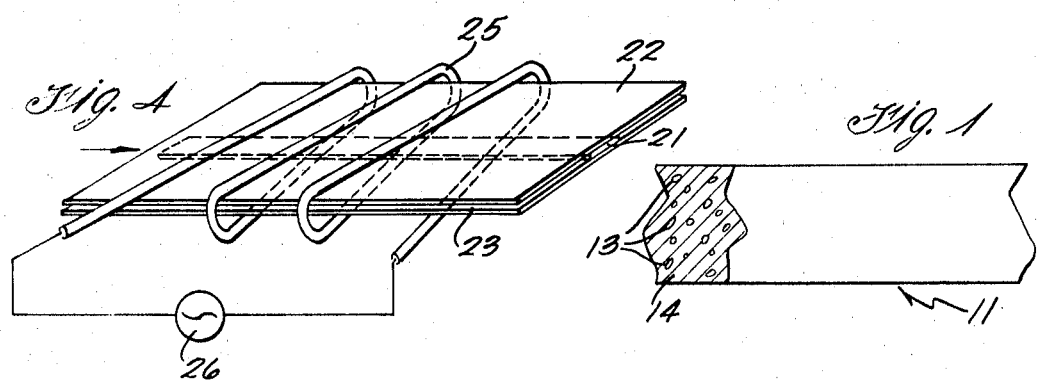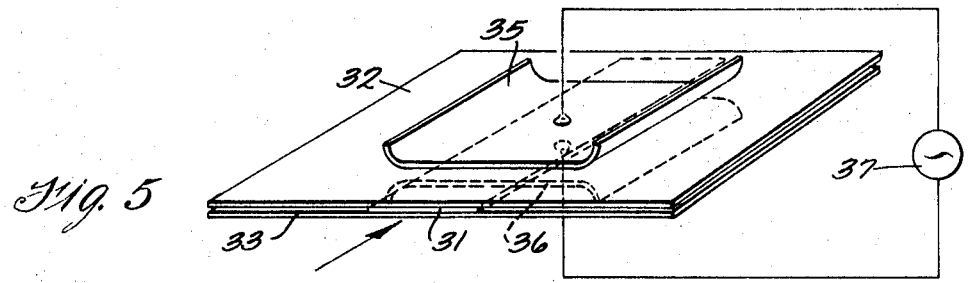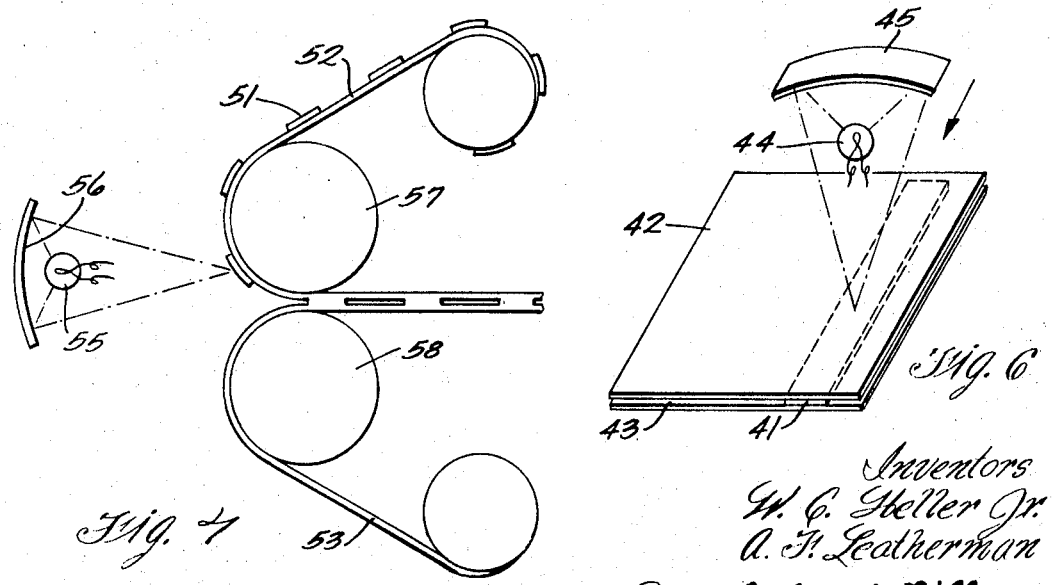

3,574,031
METHOD OF HEAT WELDING THERMOPLASTIC BODIES USING A STRATUM OF SUSCEPTOR MATERIAL
William C. Heller, Jr., 3521 N. Shepard Ave., Milwaukee, Wis. 53211, and Alfred F. Leatherman, Columbus, Ohio; said Leatherman assignor to said Heller
Filed Mar. 24, 1967, Ser. No. 625,650
Int. Cl. B29c 27/02
U.S. Cl. 156—273                                13 Claims

ABSTRACT OF THE DISCLOSURE

The present invention relates generally to improvements in the art of heat welding or sealing thermoplastic materials, and relates more particularly to an improved method of sealing thermoplastics through use of a material containing a susceptor which is utilized to generate the sealing heat.

BACKGROUND AND PRIOR ART

Various thermoplastic materials have been developed which have become extremely popular and are widely used in many fields. Among such materials are a variety of polyolefins and other plastics which, while possessing many desirable qualities for numerous purposes such as packaging, are often difficult to seal in the normal manner as by heat and pressure due particularly to the relatively high heats and critical heat ranges required to soften the material to sealing condition. These problems are especially prominent when materials of varying gages, heavy gages, oriented materials, or those having different characteristics are being worked.

In efforts to overcome these difficulties, it has recently been proposed to utilize materials which are capable of generating the necessary sealing heat upon exposure, for example, to high-frequency electrical fields for performing the sealing operations. In these prior methods of heat sealing, a heat-generating material is selected which may be heated dielectrically or by induction, and this material in the form of wire strips, screens, fillers, metallic particles or the like is placed between adjacent surfaces of the plastic to be bonded. The composite mass consisting of the plastic bodies to be joined and the heat-generating material, herein referred to as a susceptor, is then exposed to an electrical field of the proper frequency to heat the susceptor sufficiently to cause the adjacent surfaces of the plastic bodies in the vicinity of the susceptor to seal together by reason of the heat generated by the susceptor.

In such methods, it is also common to employ a carrier, referred to herein as a susceptor sealant or susceptor carrier, containing the heat-generating or susceptor material, and the carriers heretofore utilized have taken various forms. For example, adhesives bearing electromagnetic particles and in the shape of pellets, sheets, or strips are commercially available, and attempts have also been made to provide suitable liquid carriers for application by such methods as roller coating, printing or the like. One recent type of susceptor sealant or carrier is of a thermoplastic material corresponding generally to the material of the bodies to be sealed, for example, polypropylene or polyethylene extruded in ribbon or wire form or in pellet form, and these thermoplastic carriers have been resorted to in efforts to obtain a more intimate structural bond having the same physical and chemical characteristics at the joint as the materials being bonded.

However, in these prior efforts, the thermoplastic carrier constituent of the susceptor sealant has not always been selected for optimum results. For example, while it is customary to employ a polyethylene carrier for use in heat sealing polyethylene bodies, there are many varieties of polyethylene and the common practice has been to attempt to employ a single variety of polyethylene to serve as the carrier in the susceptor sealant for use in sealing all varieties of polyethylene. Thus, the results obtained are, more frequently than not, somewhat less than optimum, usually becoming evident in the form of interior mechanical strength at the bond or seal.

In addition, in prior induction heat sealing methods, it has been customary to employ heat-generating susceptor components in the nature of iron particles of relatively large size, generally ranging from about 0.05 mil to 20 mils or more in diameter or largest dimension. Such relatively large iron particles have heretofore been utilized in order to promote induction heating by eddy-current action, and the disadvantages resulting therefrom included slow sealing speeds, inferior uniformity in heating, reduced mechanical strength, and severe limitations in the application of the method to the sealing of thin materials such as are often required in the packaging industry.

The relatively slow maximum sealing speed necessitated by these former methods was due to the need for the generated heat to conduct from the points of origin in the susceptor particles to the surface of the sealant or carrier before it could act to heat and often the outer surfaces of the sealant in order to effect heat sealing. Since only the largest of the susceptor particles were efficient heat generators in the iron-particle type susceptor material, the areas between these particles necessarily contained a considerable volume of carrier material and other non-heat generating matter. Accordingly, the heat generated by the larger susceptor particles had to be conducted a distance equivalent to as much as one-half the thickness of the sealant or carrier material before becoming fully effective at the sealing surfaces. Thus, in order to promote rapid flow of sealing heat, a relatively high temperature, as compared to the heat-sealing temperature, has heretofore been required, frequently resulting in overheating and degrading of the sealant composition as well as nonuniform heating. If efforts were made to speed up the production process, more likely than not the heat sealing would only be adequate at high temperature points adjacent the larger susceptor particles and inadequate at other points where insufficient time is allowed to permit heat flow to the sealing surfaces.

The reduced mechanical strength of prior art seals formed by induction heating was due to several things. First, in view of the need to employ relatively large particles wherein the diameter of some of the susceptor particles even equalled or exceeded the thickness of the body in instances wherein sheets were being joined, a particularly undesirable ratio of surface area to volume would result. Moreover, it is recognized that the mechanical strength of a composite material such as thermoplastic or rubber which contain inorganic particles is inherently weaker when large particles are used than when smaller particles are employed. Furthermore, large particles tend to produce localized rigid areas which are, of course, undesirable when the bodies being joined are flexible sheets such as used, for example, in the packaging field. In such instances, non-uniform stress riser conditions may occur which leads to easier failure by tearing or shearing action which loosens the particle from the carrier.

With regard to the limitations attendant the use of prior methods in the bonding or sealing of relatively thin films, these are quite evident. For example, a package which must be flexible and therefore employs thin plastic film materials will obviously not be nearly as flexible after having been sealed with a carrier member or sealant sheet of some 15 mils or more thickness. Also, the large susceptor particles tend to interfere with safe and practical operation of precision machinery in which small mechanical clearances and tolerances are involved. Thus, due to the size of susceptors heretofore employed, their use has been relatively limited to bonding operations wherein they do not undesirably interfere with the conventional processes of extrusion, lamination, roller coating, doctoring, gravure, printing and the like.

It is accordingly an object of the present invention to provide an improved method of heat welding thermoplastic materials which obviates the above mentioned disadvantages and objections heretofore attendant prior methods.

Another object of the invention is to provide an improved method of heat welding thermoplastic bodies utilizing a susceptor material and carrier therefor in which evenly distributed heat generating particles of small dimension capable of application by printing or other conventional processes are employed to provide rapid and uniform generation of heat over the entire surfaces to be welded generally without need for heat conduction within the sheet or layer of the susceptor carrier.

Another object of this invention is to provide an improved method of heat welding which is particularly adapted for use in diverse heat welding operations on thin films to provide strong welds with the use of conventional converting or processing equipment and/or methods while maintaining the flexible properties of the film material in the end product.

Yet another object of the invention is to provide an improved method of heat welding thermoplastic materials by means of which exceedingly strong and uniform mechanical welds are achieved regardless of the type and/or thickness of the materials to be welded or the processes to be employed in working on the material.

The invention is characterized by the use of a susceptor sealant which becomes an intimate part of the final weld and which includes a susceptor material, heatable by induction, dielectric, or radiant energy. The susceptor material is formed of particles of a defined size which are uniformly dispersed in a thermoplastic carrier substance selected from a material compatible with the thermoplastic materials to be welded and having a heat sealing temperature range and a density higher than that of the thermoplastic materials to be welded.

The invention is further characterized by a heat welding method including the steps of forming the susceptor sealant described above, applying it to the thermoplastic bodies to be joined and exposing the susceptor sealant to a selected form of heating energy to soften the carrier substance and intimately weld the thermoplastic bodies.

DRAWING

A clear conception of the features constituting the present improvements, and the mode of practicing the invention may be had by referring to the accompanying drawing forming a part of this specification wherein like reference characters designate the same or similar parts in the several views.

FIG. 1 is a more-or less schematic plan view, partially in section, of a fragment of a typical susceptor sealant in strip form which may be utilized in the process of the present invention;

FIG. 2 is a fragmentary transverse section through two sheet-like bodies of thermoplastic material to be joined, the section including a strip of the susceptor sealant interposed between the sheets;

FIG. 3 is a section similar to that of FIG. 2 but taken after the sealing or welding operation, and showing portions of an article formed from the method of the present invention;

FIG. 4 is a schematic perspective view showing an induction heat welding process of the present invention;

FIG. 5 is another schematic perspective view showing a dielectric heat welding process of the present invention;

FIG. 6 is still another schematic perspective view showing a radiant heat welding process of the present invention; and FIG. 7 is a schematic view showing direct radiant heating employed in the process of the present invention.

DETAILED DESCRIPTION

Referring to the drawing, the invention has been illustrated therein as embodying a susceptor which is imbedded in a carrier in sheet or strip form. However, it should be understood that the susceptor sealant may be furnished in other forms and may, in fact, be sprayed, printed or otherwise applied to the surface of one of the bodies to be joined. The invention has also been illustrated as being especially utilized with and applied to film materials such as are used in the packaging industry, but it is believed apparent that the invention does have broader application and therefore should not be thus limited. As embodied herein, the term susceptor sealant is used to designate the susceptor bearing intermediate material which forms the intemediate stratum between the bodies to be joined, and the susceptor which is shown as comprised of a plurality of particles may be selected from a material which is capable of being heated as by induction, dielectrically, or radiation. It is accordingly intended that specific descriptive terms used herein shall be given the broadest possible interpretation consistent with the disclosure.

In FIG. 1, a fragment of a typical sheet or strip generally designated by the numeral 11 has been shown for purposes of illustration as being composed of a plurality of susceptor particles 13 dispersed in a carrier base 14. The susceptor particles 13 which have been somewhat magnified for purposes of illustration are selected for effective heat generation by means of a desired type of energy source to be utilized for generating the heat, dielectrically, or by induction, or by radiant heating or the like. The carrier portion 14 consists of a thermoplastic material selected from one having certain qualities as will hereinafter become apparent. While the susceptor has been shown herein as being in the form of discrete particles, a susceptor can be used which is in the form of a continuous strip, wire or the like or in the form of fibers, threads, woven fabric or screening imbedded in a suitable carrier, mixed therewith or woven with the carrier. Also, the sealant need not be in the form of a continuous sheet but may be of a type capable of application continuously or discontinuously either in a pattern or indiscretely.

In normal use, the susceptor sealant sheet 11 of FIG. 1 is positioned between the two areas of surfaces 16, 17 of the thermoplastic films or similar bodies 18, 19 respectively to be joined. The assembled mass of FIG. 2 is then exposed to a source of energy selected to generate heat in the susceptor constituent or particles 13 of the sealant sheet 11 and the heat thus generated in the susceptor quickly conducts into all portions of the carrier material 14 of the sheet 11 so as to uniformly heat the sheet 11 throughout due to the careful selection of the particle size of the susceptor 13 and the equally careful selection of the proper material for the carrier 14 as will hereinafter more fully appear. Then, as the susceptor sealant sheet 11 becomes heated to a sufficient temperature to represent a point within the heat sealing temperature range of the carrier material 14 of the sheet 11 and the sheets 18, 19 being bonded, the application of pressure and subsequent cooling in accordance with known practice produces heat sealed bonds within the area of the sheet 11 between the surfaces 16, 17 as shown in FIG. 3. Thus, as indicated in FIG. 3, the bond or seal between materials 11 and 18, 19 is continuous and intimate when the susceptor and carrier materials are selected in accordance with the present invention.

In properly selecting the susceptor material 13 and the carrier material 14, it has been discovered that superior results are obtained and an intimate bond or weld is effected when the carrier material 14 is selected from the same chemical family as the materials forming the bodies 18, 19 to be joined. Thus, for example, a polyetheylene carrier 14 should be selected when it is desired to seal polyethylene bodies 18, 19, and polypropylene should be selected for the carrier material 14 when it is desired to seal polypropylene bodies 18, 19. However, it has been found that the best results are obtained only if the heat sealing temperature range of the carrier 14 is at least as high as that of the materials to be joined. We have also discovered that the relative density of the materials should likewise be used as a guideline, and the best results are obtained in the sealed or bonded area when the density of the carrier material 14 is at least as high as that of the material comprising the bodies 18, 19. As a matter of fact, in some of our experiments in heat sealing polyethylene bodies, it has been found preferable to select a carrier material having a somewhat higher density than that of the materials to be sealed, and such results were, in fact, unexpected due to the fact that the common belief is that the optimum conditions occur when the carrier and the materials to be joined are identical. Thus, contrary to customary practices and beliefs, this invention utilizes a carrier having a density at least as high and in many instances higher than that of the materials to be worked upon or joined. Accordingly, if desired, an economical and technical advantage can be achieved by utilizing a single high density carrier for the heat sealing of all thermoplastic materials of the same chemical family having densities which are equal to or lower than that of the carrier. With respect to the susceptor material 13, it has been discovered that a uniform dispersion of small particles is superior to the use of larger particles for various reasons, and in accordance with this invention the maximum particle dimension of the susceptor 13 is preferably equal or less than approximately one-fourth of the thickness of a susceptor sealant sheet 11 or the like within which the particles 13 are dispersed. Thus, the larger ratio of surface area to volume as offered by the small particles provides a greater surface area for efficient heat transfer from the susceptor particles 13 to the carrier material 14 to thereby more effectively heat the seal area. Also, the larger ratio of surface area to volume as offered by the small particles provides a relatively large surface area over which any chemical, physical and/or mechanical adhesive forces which may exist between the susceptor particles and the carrier may be effective in contributing to the composite mechanical strength of the susceptor sealant and thus to the strength of the resultant seal. In addition, the uniform dispersion of small particles as taught by this invention provides an arrangement in which the physical distance from the center of any particles to the surface of susceptor sealant sheet 11 is, on the average, no greater than approximately one-eighth of the distance through the sheet. This affords very desirable conditions for rapid development of high temperatures at all portions of the sheet with particular importance to the heating of the exterior surfaces thereof since the welded bond in the materials being joined is formed at the surface areas. In addition, the use of small particles as taught herein helps to maintain the flexibility of the bodies 18, 19 and avoids the tendency of the particles to separate from the surrounding carrier as in the case of larger susceptor particles. Furthermore, since the susceptor particles of the present invention are small and close to the surface, the difference in the susceptor surface temperature and the heat sealing temperature is minimized due to the rapid flow of heat from the susceptor particles 13 to the seal area. This reduction in the temperatures necessary to effect sealing minimizes the possibility of damage to the carrier material and to the bodies being joined. Also, since the physical separation between centers of individual small susceptor particles is generally less along the surface of the susceptor sealant sheet than in instances wherein larger particles are utilized, the areas of high temperature occur closer together and with greater uniformity which results in a continuous heat sealed weld bond rather than an intermediate bond. The use of small particles of a size smaller than the thickness of popular plastic films furthermore permits conventional means of application and handling to be employed without basic modifications, thus permitting application by ink, electrostatic depositing, gravure printing, application by doctor blade, roller coating, lamination, extrusion and the like.

With specific regard to typical energy forms which may be employed for the heat sealing operation, FIG. 4 illustrates the use of induction heating of the hysteresis type, although induction of the eddy-current type may be employed in some instances when there is a proper relationship of particle size and type with respect to frequency. As shown in FIG. 4, a strip of susceptor sealant material 21 is shown in position between two films 22, 23 of thermoplastic. The mass comprising the strip 21 and thermoplastic bodies 22, 23 are passed within and through an induction heating coil 25 which is connected to a suitable high frequency power supply 26 which may, for example, consist of a vacuum tube oscillator operating at 5 megacycles. It should be understood that any suitable means may be employed at the coil 25 or subsequent thereto for applying pressure to the mass to aid the heat sealing, or the coil itself may be so designed as to be capable of use for applying pressure. Also, while the susceptor sealant material 21 is generally applied to the zone between the sheets 22, 23 prior to entry of the materials into the area of the coil 25, the materials may be assembled separately into the coil or the coil may be utilized in other manners according to the preference of the user. Again, it should be understood that the susceptor sealant material 21 need not be in the form of a solid sheet but may be in any desired form and shape applied in any suitable manner. In a typical case employing induction heat of the hysteresis type, the susceptor material may consist of a magnetic iron oxide of a particle size not greater than about one-fourth of the thickness of the susceptor sealant sheet 21. Accordingly, if the susceptor sealant sheet or layer 21 is 0.002 inch in thickness, the particles would preferably not be greater than 0.0005 inch in diameter. Also, a typical carrier composition would consist of a high density polyethylene carrier when heat sealing medium density polyethylene sheets 22, 23, the sealant being prepared with less than about 100 parts by weight of iron oxide to 100 parts of polyethylene.

In the embodiment of FIG. 5, the invention is illustrated as being used in a dielectric heating process. In this embodiment, dielectric heating serves to generate the heat for the susceptor sealant material 31 to join the thermoplastic bodies 32, 33. It is again preferable to employ a carrier member selected from one having the properties hereinabove indicated with respect to sealing temperature range and density, but in this case, the susceptor sealant must contain a susceptor which is receptive to dielectric heating. Susceptor materials of the polymeric type known to be useful as dielectric heating susceptors include the halogenated polymers such as the polymers and copolymers of vinyl chloride, vinyl fluoride, vinylidene chloride, and vinylidene fluoride, and the polycarbonates, polyurethanes, polyacetals, and cellulose derivatives amongst others. As shown in FIG. 5, a typical arrangement for dielectric heating may employ electrodes 35, 36 connected to a suitable source of high frequency power 37. The material may be introduced to the dielectric heater and pressure may be applied as hereinabove described with respect to FIG. 4. Likewise, the susceptor sealant may be applied in the same manner as hereinabove described.

As shown in FIG. 6, radiant energy may also be used in practicing the invention. In this instance, a susceptor sealant material 41 sensitive to radiant heating is employed for heat sealing the thermoplastic sheets 42, 43. A source of infrared energy, illustrated as being in the form of an electric lamp 44, and a reflector 45 which serves to focus the energy onto the susceptor sealant material 41 supply the source of energy for heating the susceptor which quickly softens the sealant material for the heat sealing operation. In tis type of radiant heat sealing operation, at least one of the bodies 42, 43 must necessarily be able to transmit a substantial portion of the infrared radiation in order for it to reach the susceptor material contained in the stratum or sealant 41, and many such transparent or translucent thermoplastic films are commercially available and are widely used. For example, a typical susceptor sealant material 41 for heat sealing with infrared could be comprised of a polyethylene carrier having the same preferred qualities with regard to sealing temperature and density as noted above with carbon black particles being utilized as the susceptor material. As hereinabove indicated the mass comprising the elements 41, 42 and 43 are again introduced in a suitable manner to the heating zone and pressure may also be utilized as hereinabove indicated. In addition to energy sources such as infrared and lasers, it is to be understood that other forms of radiant energy such as X-ray, ion beams, electronic beams, ultrasonic beams, and nuclear radiation, amongst others, may be used for generating the heat in suitable susceptors selected as being responsive thereto.

It should also be understood that the invention may be used to join various combinations of materials such as thermoplastic film and paperboard or similar non-thermoplastic materials. In this connection, the lower sheet 43 of FIG. 6 could comprise a piece of paperboard upon which the susceptor sealant material 41 had previously been applied by any suitable method such as printing, coating or extrusion, and the generation of heat in the susceptor contained in the sealant 41 would then become effective to seal the upper sheet 42.

While all of the heat generating processes hereinabove described employ an energy source or establish energy fields which pass through the materials being joined, this is not a requisite in practicing the present invention. For example, in FIG. 7, the use of radiant heat is illustrated in a process wherein the susceptor sealant 51 has been applied to one of the bodies 52 prior to introduction of the susceptor into the focus of the radiant energy field formed by the lamp 55 and reflector 56. Since the process shown in FIG. 7 may be operated at relatively high speeds, the heated susceptor sealant 51 remains in the soft sealing state generated by the radiant energy field for a sufficient time to permit the sheet 52 to enter a pair of cooperating pressure rolls 57, 58 together with the sheet 53 in order to complete the heat sealing operation. The softened susceptor sealant 51 then forms a bond with the sheet 53 as pressure is applied while the susceptor is still in heated condition.

Various modes of carrying out the invention are contemplated as being within the scope of the following claims particularly pointing out and distinctly claiming the subject-matter which is regarded as the invention.

We claim:

1. The method of heat welding thermoplastic bodies which comprises the steps of:
    forming a stratum of susceptor sealant by uniformly dispersing particles of a susceptor material selected from a group consisting of magnetically polar substances and electrically polar substances, excitable by a selected form of indirectly applied energy for raising the temperature of the susceptor material in a thermoplastic carrier compatible with the chemical families of the thermoplastic bodies to be welded, each of said particles having a maximum dimension less than the thickness of the stratum;
    applying the stratum of susceptor sealant to the bodies in the area to be heat welded; and
    exposing the susceptor sealant to the selected form of indirectly applied energy to generate heat therein sufficient to soften the carrier and cause the stratum to intimately weld the thermoplastic bodies.

2. The method according to claim 1 wherein the susceptor material comprises an electrically polar substance and the method is further defined as including the step of exposing the susceptor sealant to inductive heating energy.

3. The method according to claim 1 wherein the susceptor material comprises an electrically polar substance and the method is further defined as including the step of exposing the susceptor sealant to dielectric heating energy.

4. The method according to claim 1 wherein the susceptor material comprises an electrically polar substance and the method is further defined as including the step of exposing the susceptor sealant to radiant heating energy.

5. A method according to claim 1, wherein the carrier is selected from a thermoplastic substance having a heat-sealing temperature range at least portions of which exceed the heat sealing temperature ranges of the thermoplastic bodies to be welded.

6. A method according to claim 1, wherein the carrier is selected from a thermoplastic substance having a density higher than that of the thermoplastic bodies to be welded.

7. A method according to claim 1, wherein the stratum including both the susceptor material and thermoplastic carrier is applied to at least one of the thermoplastic bodies in fluid form.

8. A method according to claim 1, wherein the maximum dimensions of the susceptor particles at the time of application is less than one-fourth the thickness of the stratum.

9. A method according to claim 1, wherein the concentration of the susceptor particles is less than 100 parts by weight to 100 parts carrier.

10. A method according to claim 1, wherein the stratum is applied intermediate two bodies to be welded and is discontinuous.

11. A method according to claim 1, wherein the stratum is applied in a predetermined pattern intermediate two bodies to be welded.

12. The method of heat welding thermoplastic bodies which comprises the steps of:
    forming a susceptor sealant by dispersing a susceptor material selected from a group consisting of magnetically polar substances and electrically polar substances excitable by a selected form of indirectly applied energy for raising the temperature of the susceptor material in a thermoplastic carrier compatible with the chemical families of the thermoplastic bodies to be welded and having a heat sealing temperature range at least portions of which exceed the heat sealing temperature ranges of the bodies;
    applying the susceptor sealant to the bodies in the area to be welded; and
    exposing the susceptor sealant to the selected form of energy to generate heat therein sufficient to soften the carrier and cause the same to intimately weld the thermoplastic bodies.

13. The method of heat welding thermoplastic bodies which comprises the steps of:
    forming a susceptor sealant by dispersing a susceptor material selected from a group consisting of magnetically polar substances and electrically polar substances excitable by a selected form of indirectly applied energy for raising the temperature of the susceptor material in a thermoplastic carrier compatible with the chemical families of the thermoplastic bodies to be welded and having a density higher than that of the bodies;

applying the susceptor sealant to the bodies in the area to be welded; and exposing the susceptor sealant to the selected form of energy to generate heat therein sufficient to soften the carrier and cause the same to intimately weld the thermoplastic bodies.

No references cited.

BENJAMIN R. PADGETT, Primary Examiner

S. J. LECHERT, Jr., Assistnt Examiner

U.S. Cl. X.R.

117—37; 161—146; 156—272, 275, 276, 291, 313, 327

UNITED STATES PATENT OFFICE
CERTIFICATE OF CORRECTION

Patent No. 3,574,031             Dated April 6, 1971

Inventor(s) W. C. HELLER, JR. and A. F. LEATHERMAN

It is certified that error appears in the above-identified patent and that said Letters Patent are hereby corrected as shown below:

| | |
|---|---|
| Column 1, line 59, | After "coating," and before "printing" insert ---painting, |
| Column 2, line 11, | Cancel "interior" and substitute therefor ---inferior--- |
| Column 2, line 29, | Cancel "often" and substitute therefor ---soften--- |
| Column 7, line 10, | Cancel "tis" and substitute therefor ---this--- |
| Column 8, line 8, | Cancel "an electrically" and substitute therefor ---a magnetically--- |

Signed and sealed this 2nd day of November 1971.

(SEAL)
Attest:

EDWARD M. FLETCHER, JR.              ROBERT GOTTSCHALK
Attesting Officer                    Acting Commissioner of Paten